(12) United States Patent
Eakins

(10) Patent No.: US 10,023,325 B2
(45) Date of Patent: Jul. 17, 2018

(54) METHODS AND ASSEMBLY FOR ILLUMINATING A SURFACE OF AN AIRCRAFT PASSENGER CABIN

(71) Applicant: The Boeing Company, Seal Beach, CA (US)

(72) Inventor: Mark Edward Eakins, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 14/170,723

(22) Filed: Feb. 3, 2014

(65) Prior Publication Data
US 2015/0151850 A1 Jun. 4, 2015

Related U.S. Application Data

(60) Provisional application No. 61/911,684, filed on Dec. 4, 2013.

(51) Int. Cl.
*B64D 47/02* (2006.01)
*B64F 1/20* (2006.01)
(Continued)

(52) U.S. Cl.
CPC ............... *B64D 47/02* (2013.01); *B60Q 3/43* (2017.02); *B60Q 3/64* (2017.02); *B64D 11/00* (2013.01);
(Continued)

(58) Field of Classification Search
CPC ...... B60Q 3/005; B60Q 3/025; B60Q 3/0283; B60Q 3/0253; B60Q 2500/10; B60Q 3/43;
(Continued)

(56) References Cited

U.S. PATENT DOCUMENTS 2,198,579 A * 4/1940 Mayer ........................... 362/479
4,673,254 A * 6/1987 Kato ..................... G02B 5/0263
349/65
(Continued)

FOREIGN PATENT DOCUMENTS

JP 2010277727 A 12/2010
WO 2011144236 A1 11/2011
(Continued)

OTHER PUBLICATIONS

"Illumination Fundamentals" accessed from http://optics.synopsys.com/lighttools/pdfs/illuminationfund.pdf on Aug. 12, 2015.*
(Continued)

*Primary Examiner* — Erin Kryukova
(74) *Attorney, Agent, or Firm* — Armstrong Teasdale LLP

(57) ABSTRACT

A method of making a light guide for an aircraft passenger cabin is provided. The method includes determining, for each of a plurality of points on an interior surface of the cabin, a corresponding fixture angle from a light fixture receptacle, a distance, and an angle of incidence at the point. The method also includes calculating an incident light intensity for each of the plurality of points, assuming a light source that emits light of uniform intensity at each fixture angle. Additionally, the method includes calculating a relative ray strength from each fixture angle needed to produce a desired incident light intensity at each corresponding point, and disposing a plurality of light extraction features on a unit length of the light guide such that at least one of a number and a size of the light extraction features are determined based on the relative ray strength for that fixture angle.

20 Claims, 7 Drawing Sheets

(51) Int. Cl.
  *F21V 1/20* (2006.01)
  *F21V 21/00* (2006.01)
  *F21V 7/04* (2006.01)
  *B64D 11/00* (2006.01)
  *F21V 8/00* (2006.01)
  *B60Q 3/64* (2017.01)
  *B60Q 3/43* (2017.01)

(52) U.S. Cl.
  CPC ......... G02B 6/0061 (2013.01); G02B 6/0095 (2013.01); *B64D 2011/0038* (2013.01); *B64D 2203/00* (2013.01); *G02B 6/0021* (2013.01); *G02B 6/0036* (2013.01); *Y10T 29/49826* (2015.01)

(58) Field of Classification Search
  CPC .............. B60Q 3/64; B64D 2011/0053; B64D 2011/0038; B64D 2203/00; B64D 47/02; G02B 6/0061; G02B 6/0018; G02B 6/001; G02B 6/0036; G02B 6/0095; G02B 6/0066; F21V 5/005
  See application file for complete search history.

(56) References Cited

U.S. PATENT DOCUMENTS

| | | | |
|---|---|---|---|
| 5,775,791 A * | 7/1998 | Yoshikawa | G02B 6/0061 362/23.15 |
| 5,921,670 A | 7/1999 | Schumacher et al. | |
| 6,621,973 B1 * | 9/2003 | Hoffman | G02B 6/0096 385/125 |
| 7,334,932 B2 | 2/2008 | Klettke | |
| 7,540,639 B2 * | 6/2009 | Clark | 362/471 |
| 8,845,175 B2 * | 9/2014 | Wang He | G02B 6/0036 362/623 |
| 2007/0189701 A1 | 8/2007 | Chakmajian et al. | |
| 2008/0049440 A1 | 2/2008 | Gaydoul | |
| 2011/0299295 A1 * | 12/2011 | Mochizuki | 362/558 |
| 2013/0033900 A1 * | 2/2013 | McCollum | G09F 13/02 362/612 |
| 2013/0208473 A1 | 8/2013 | Palagashvili et al. | |
| 2014/0063839 A1 * | 3/2014 | Guy et al. | 362/558 |
| 2014/0268865 A1 * | 9/2014 | Matthew | 362/558 |

FOREIGN PATENT DOCUMENTS

| | | |
|---|---|---|
| WO | 2012130497 A1 | 10/2012 |
| WO | 2014036370 A1 | 3/2014 |

OTHER PUBLICATIONS

Application Brief I-003, Light Guide Techniques: Using LED Lamps, Avago Technologies, retrieves from http://www.avagotech.com/docs/5988-7057EN, 22 pgs.

International Search Report and Written Opinion, dated Jan. 12, 2015, for co-pending International application No. PCT/US2014/057277 (12 pgs).

PCT International Preliminary Report on Patentability for related application PCT/US2014/057277 dated Jun. 16, 2016; 8 pp.

* cited by examiner

METHODS AND ASSEMBLY FOR ILLUMINATING A SURFACE OF AN AIRCRAFT PASSENGER CABIN

CROSS REFERENCE TO RELATED APPLICATIONS

This application claims priority to U.S. Provisional Application No. 61/911,684 filed Dec. 4, 2013, which is hereby incorporated by reference in its entirety.

BACKGROUND

The field of the disclosure relates generally to interior lighting systems, and, more particularly, to systems for providing interior lighting in the passenger cabin of an aircraft.

Aircraft passenger cabins are known to have lighting fixtures designed to illuminate a specific targeted area, such as for reading, sometimes referred to as "task" lighting. Aircraft passenger cabins also are known to have lighting fixtures that direct light along the surfaces of walls and ceilings, sometimes referred to as "general" or "wash" lighting. The illumination pattern produced by the wash lighting is considered to have an effect on the mood and wellbeing of the passengers.

Traditionally, fluorescent lamps have been used for providing wash lighting, such as along the ceiling of an aircraft passenger cabin. A typical aircraft cabin arrangement is to have one or two rows of fluorescent tubes extending along the edge of the ceiling panels for each aisle along the length of the passenger cabin, parallel to the aircraft centerline. The fluorescent tubes themselves are generally hidden from direct view by shielding them behind a valance or similar device. However, a significant proportion of the generated light is thus blocked without providing any useful interior lighting. Moreover, fluorescent lamps generate a high light intensity on surfaces near the lamp, and a dramatically lower intensity (which decreases in proportion to the square of the distance from the lamp surface) on surfaces farther away from the lamp. This wide variation in surface brightness may not be ideal for the comfort of the passengers.

It is also known to use light emitting diode (LED) fixtures as a supplement or replacement for fluorescent lamps to provide wash lighting. For example, it is known to use a combination of LEDs producing light of different wavelengths in order to provide wash lighting with a desired color balance. It is also known to supplement fluorescent lighting with LEDs outputting light through a light guide element with a U-shaped cross section, with the parallel ends of the "U" serving as the light exit surfaces. While these arrangements permit a variation of light output intensity from the LED output point over time, however, they still provide no means to control the varying intensity distribution along the wash-lighted surface at any given time due to the decrease in intensity with distance from the output point.

At least some known wash lighting systems provide for wash lighting using a lens assembly to focus more light intensity to a particular area. However, such known lens systems are not tuned to provide a desired surface intensity profile across a particular surface. In addition, at least some known wash lighting systems route the output of an LED through a micro lens assembly in a compact lighting fixture. Rather than extending parallel to the aircraft centerline like a traditional fluorescent lamp, the compact lighting fixture produces a desired illumination pattern on a smaller surface area. For example, multiple compact lighting fixtures positioned a certain distance apart from each other relative to an axis parallel to the aircraft centerline are needed to provide illumination along the full extent of the passenger cabin ceiling. The multiple compact lighting fixtures create slightly overlapping patterns that inhibit providing a uniform light distribution along the extent of the surface. Moreover, the compact lighting fixtures do not fit the traditional geometry of wash lighting fixtures. Thus, in some circumstances it may be desirable to provide a wash lighting device that extends longitudinally, similarly to a traditional fluorescent lamp, and provides for a uniform intensity distribution, or other desired intensity distribution, of wash lighting.

BRIEF DESCRIPTION

In one aspect, a method of making a light guide for an aircraft passenger cabin is provided. The method includes determining, for each of a plurality of points on an interior surface of the cabin, a corresponding fixture angle of a ray drawn to the point from a light fixture receptacle, a distance of the point from the light fixture receptacle, and an angle of incidence of the ray at the point. The method also includes calculating an incident light intensity for each of the plurality of points based on the distance and the angle of incidence, wherein a light source that emits light of uniform intensity at each fixture angle is assumed to be in the light fixture receptacle. Additionally, the method includes calculating a relative ray strength from each fixture angle needed to produce a desired incident light intensity at each corresponding point, and disposing a plurality of light extraction features in a first pattern on a first unit length of the light guide along a longitudinal direction of the light guide, such that at least one of a number and a size of the light extraction features at each fixture angle are determined based on the relative ray strength calculated for that fixture angle.

In another aspect, a method of providing uniform illumination for a panel of an aircraft cabin is provided. The panel includes a plurality of points each associated with a corresponding fixture angle of a ray drawn to the point from a light fixture receptacle, and the method includes providing a light guide assembly having a light guide and a light source. Providing a light guide assembly includes providing a plurality of light extraction features disposed in a first pattern on a first unit length of the light guide along a longitudinal direction of the light guide, and the first pattern is configured such that at least one of a number and a size of the light extraction features at each fixture angle are inversely proportional to an incident light intensity given by $$I = \frac{P}{4\pi r^2} \cos(\theta)$$

where, for each fixture angle, r is a distance of the corresponding point from the light fixture receptacle, $\theta$ is an angle of incidence of the ray at the point, and P is an arbitrary constant value. The method further includes installing the light guide assembly in the light fixture receptacle.

In yet another aspect, a light guide assembly for illuminating a surface of an aircraft passenger cabin is provided. The surface includes a plurality of points each associated with a corresponding fixture angle of a ray drawn to the point from a light fixture receptacle, and the light guide assembly includes a light guide having a first unit length along a longitudinal direction of the light guide and a light source coupled to the light guide. The light guide assembly also includes a plurality of light extraction features disposed on the first unit length in a first pattern, and the first pattern is configured such that when the light guide assembly is installed in the light fixture receptacle, at least one of a number and a size of the light extraction features at each fixture angle correspond to a relative ray strength calculated for that fixture angle based on a distance of the corresponding point from the light fixture receptacle, an angle of incidence of the ray at the point, and a desired incident light intensity.

DETAILED DESCRIPTION

The systems and methods described herein provide a wash lighting system for the cabin of an aircraft. The wash lighting systems and methods provide a desired wash lighting intensity distribution, such as a uniform intensity distribution or a decorative design, for an interior surface of the cabin. The systems and methods also minimize inefficiency in the usage of energy by a light source.

Figure 1:
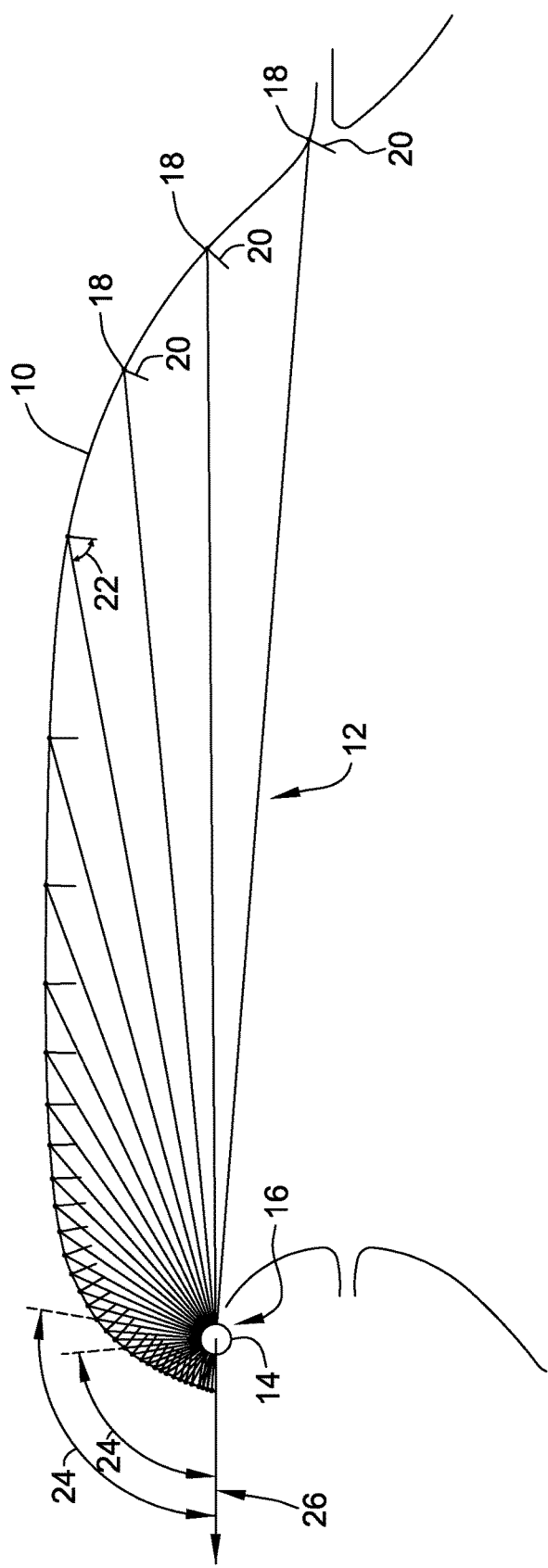
FIG. 1 is a simplified cross-sectional view of an aircraft passenger cabin ceiling and wash lighting fixture.
Figure 2:
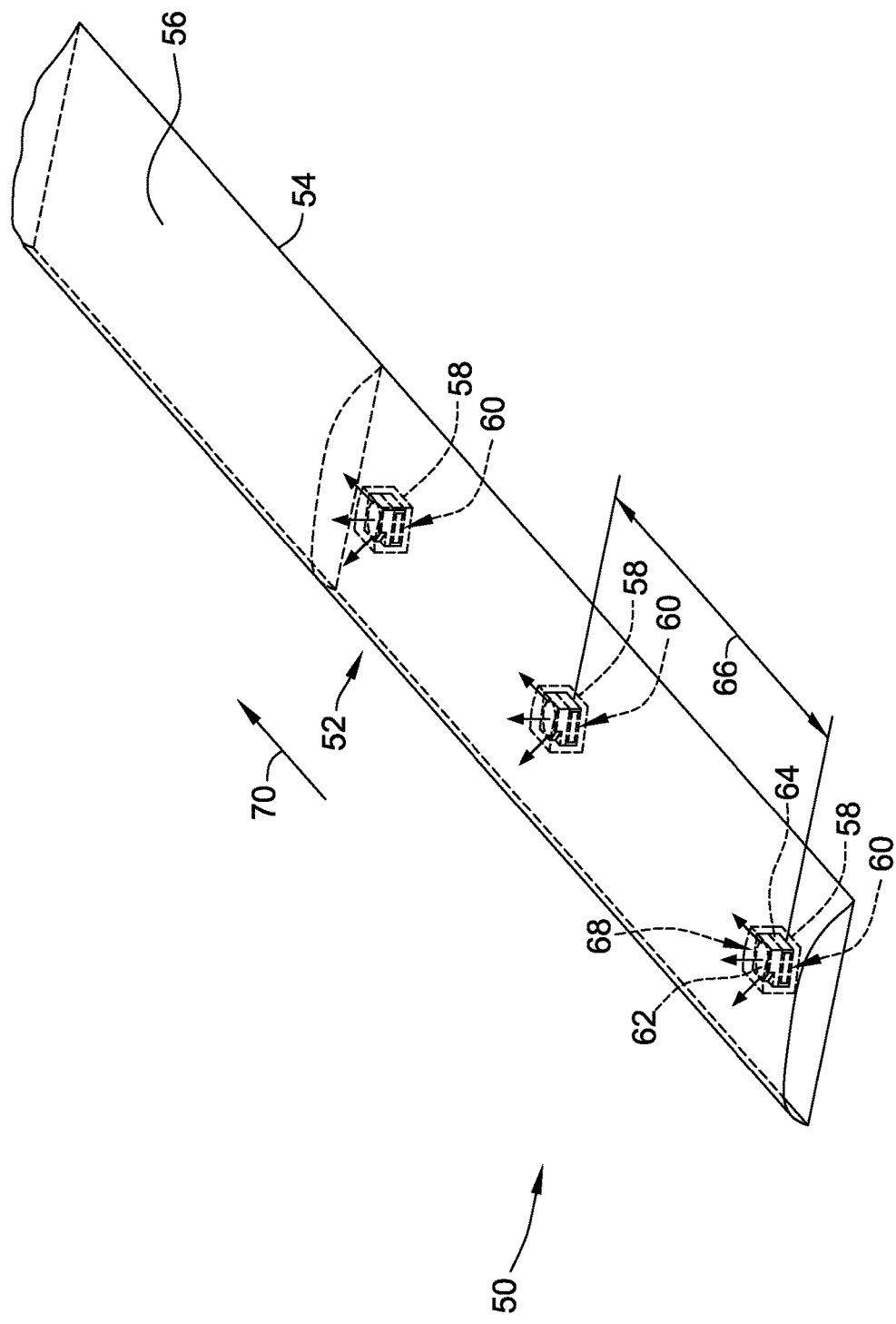
FIG. 2 is a schematic diagram of an internal structure of an exemplary light guide assembly.
Figure 3:
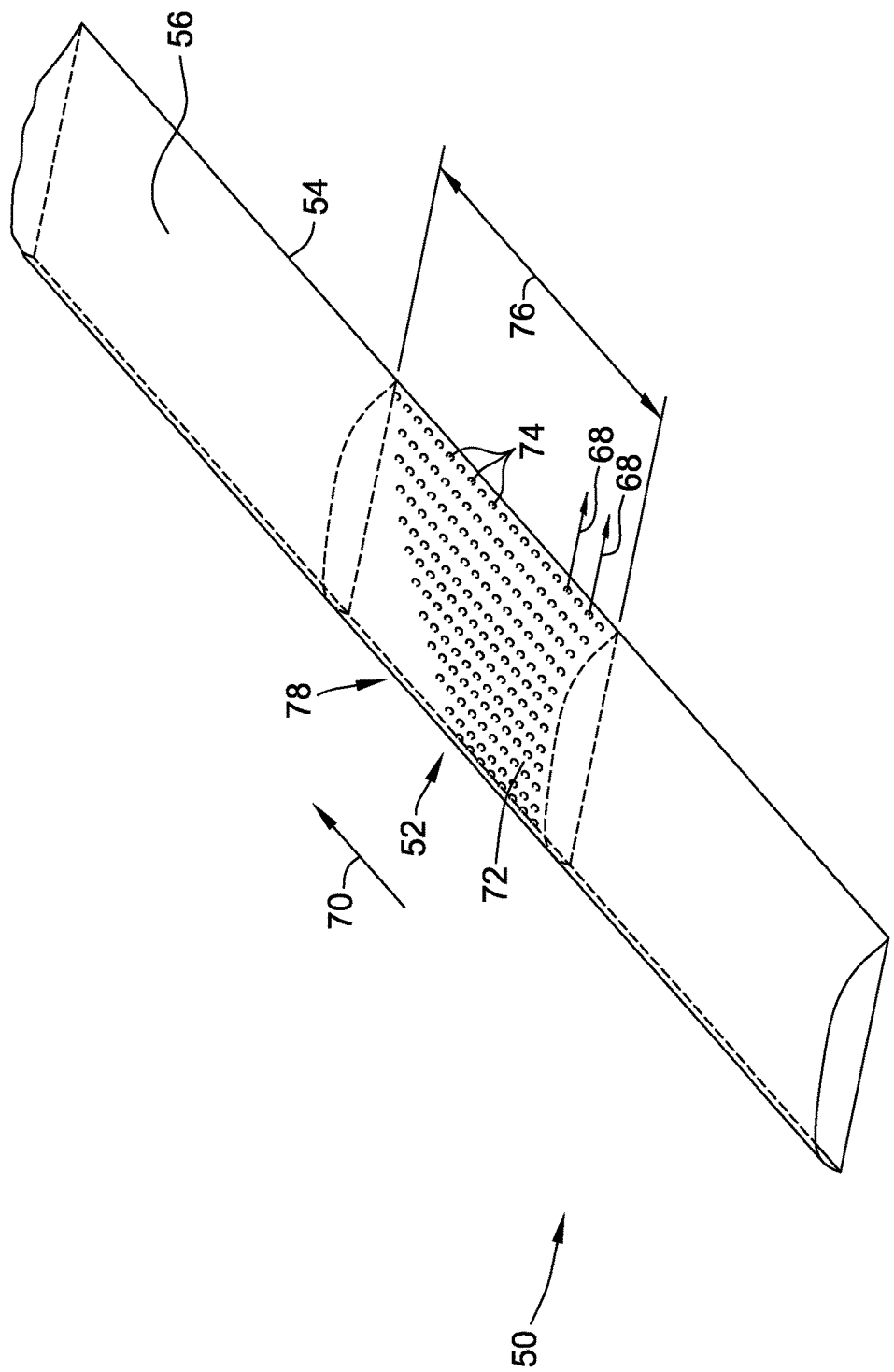
FIG. 3 is a schematic diagram of a surface structure of an exemplary light guide assembly.
Figure 4:
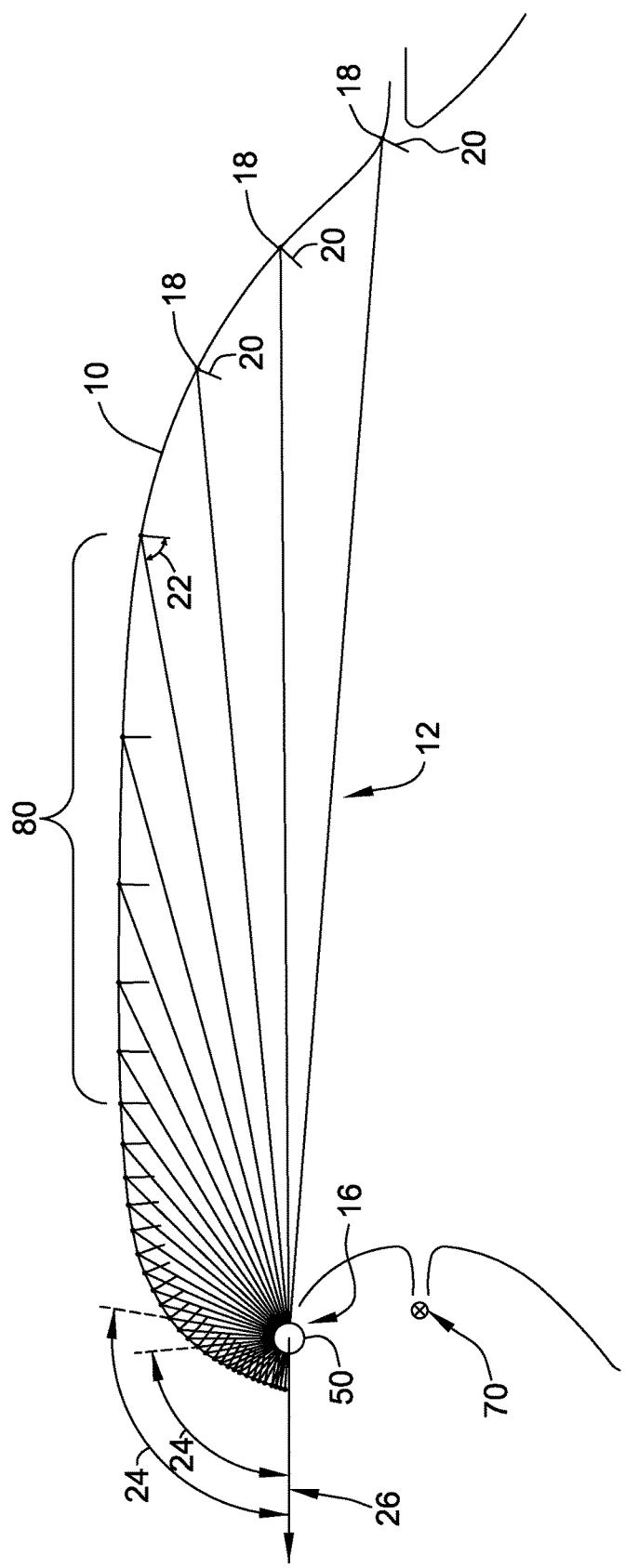
FIG. 4 is a simplified cross-sectional view of the aircraft passenger cabin ceiling and wash lighting fixture from FIG. 1 with the exemplary light guide assembly of FIG. 2 and FIG. 3 installed.
Figure 5:
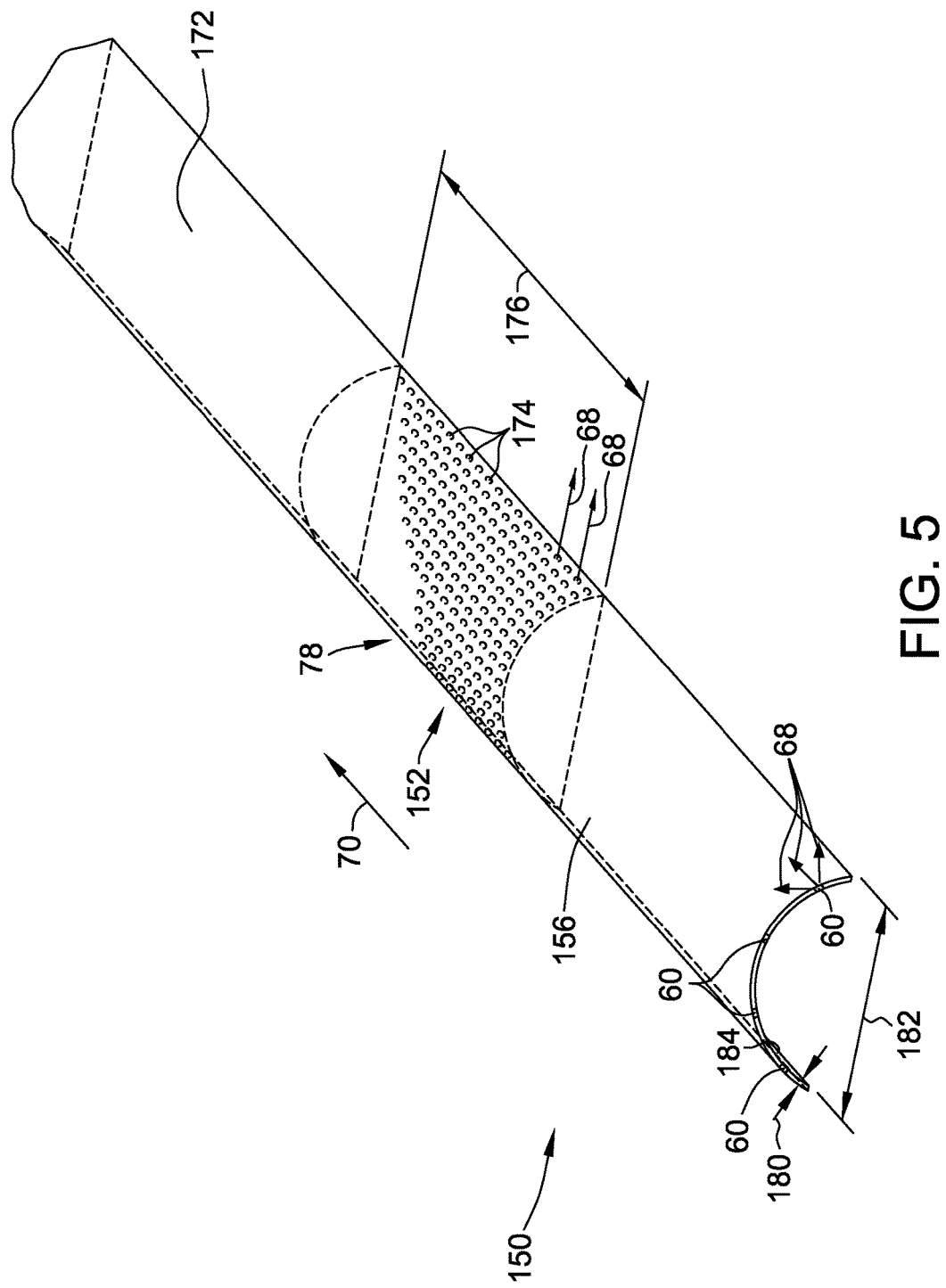
FIG. 5 is a schematic diagram of another exemplary light guide assembly.
Figure 6:
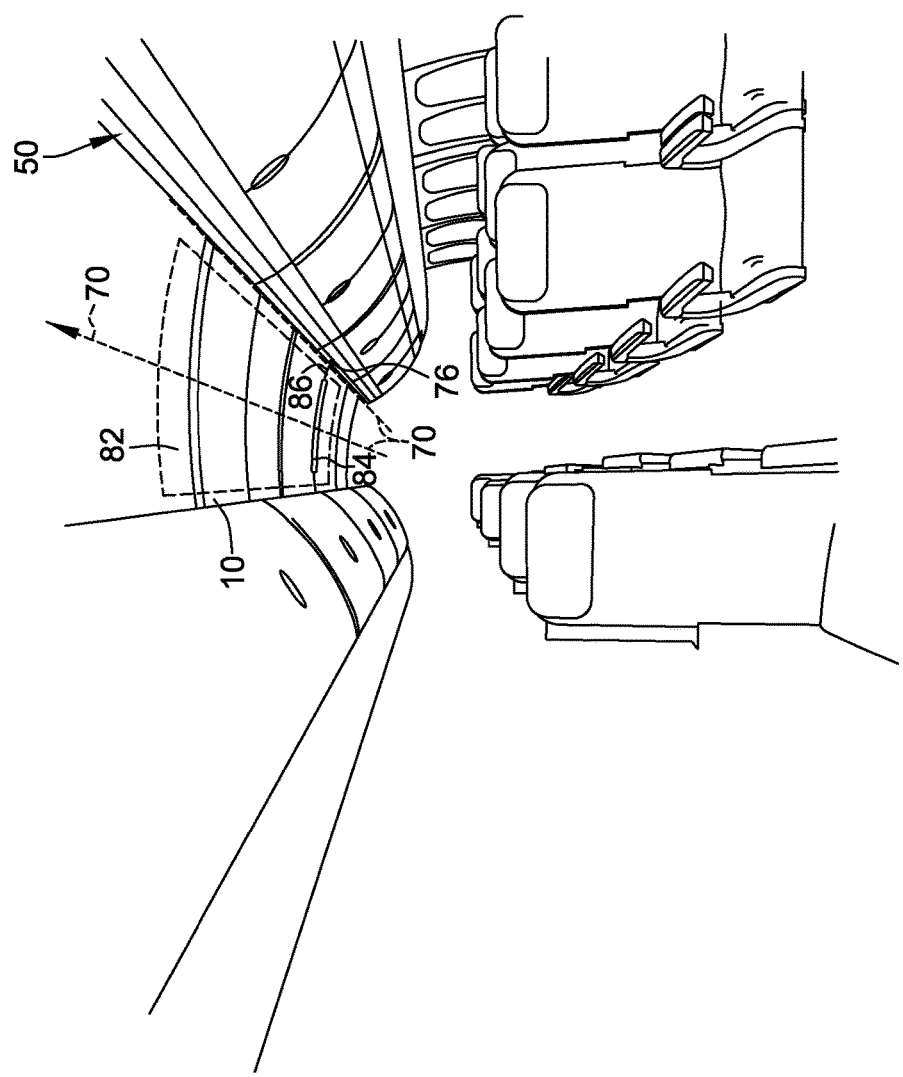
FIG. 6 is a perspective view of an exemplary light guide assembly installed in the wash lighting fixture of the exemplary aircraft passenger cabin ceiling.
Figure 7:
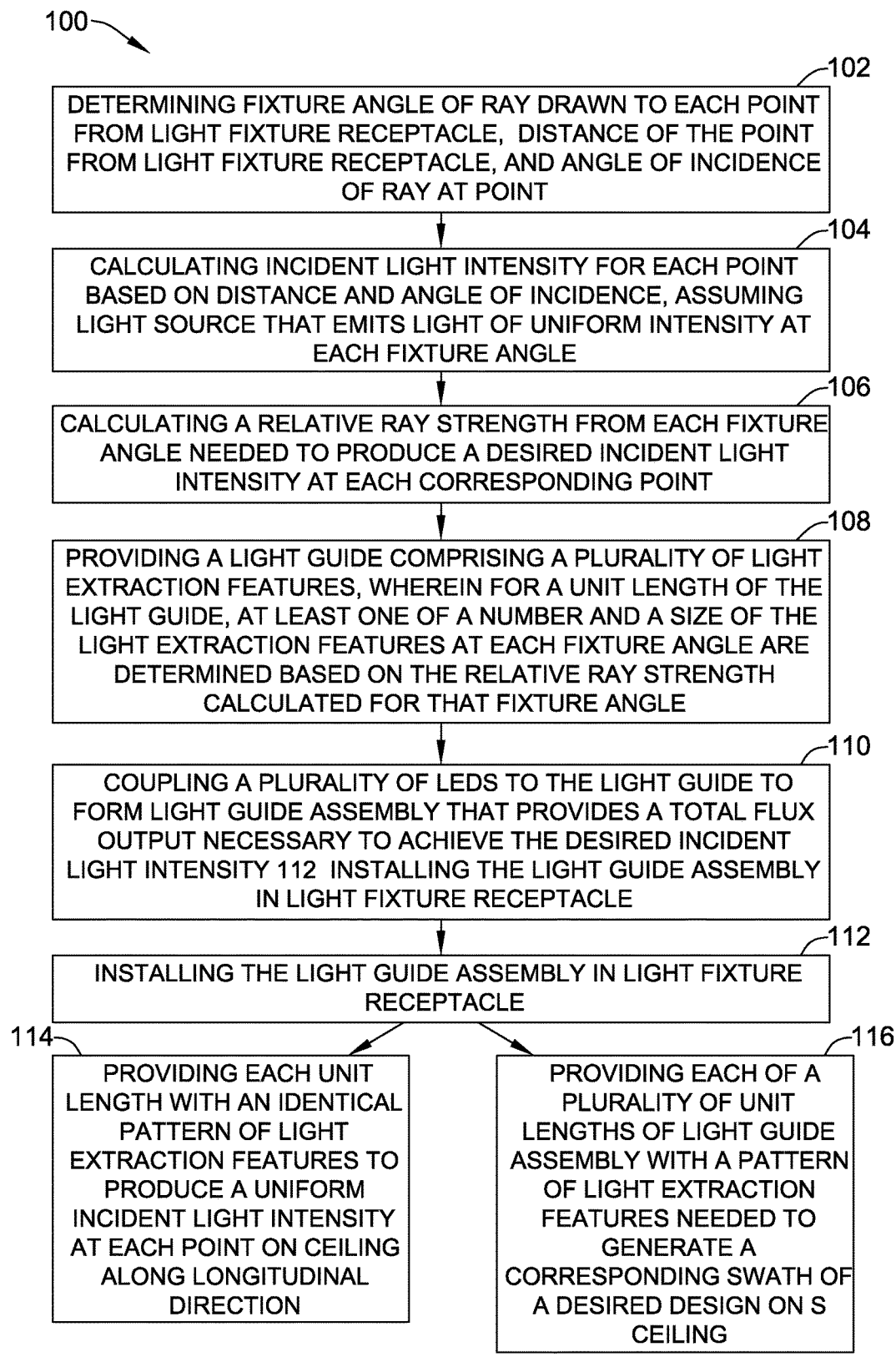
FIG. 7 is a flowchart of an exemplary method of making a light guide assembly.

Referring more particularly to the drawings, implementations of the disclosure may be described in the context of an exemplary interior surface of an aircraft, such as aircraft passenger cabin ceiling 10 as shown in FIG. 1, an exemplary light guide assembly 50 as shown in FIG. 2 and FIG. 3, the exemplary ceiling 10 of FIG. 1 illuminated by the exemplary light guide assembly 50 of FIG. 2 and FIG. 3 as shown in FIG. 4, another exemplary light guide assembly 150 as shown in FIG. 5, the exemplary light guide assembly 50 or 150 illuminating the exemplary aircraft passenger cabin ceiling 10 with a design as shown in FIG. 6, and an exemplary method 100 of providing a desired wash lighting intensity distribution for an interior surface of an aircraft as shown in FIG. 7.

With reference to FIG. 1, cabin ceiling 10 receives a plurality of light rays 12 from a test light source 14 located in light fixture receptacle 16. A fixture angle 24 can be defined as the angle at which a given ray 12 leaves test light source 14, measured in a clockwise direction from a horizontal axis 26. Test light source 14 appears as a point in the cross-sectional view of FIG. 1, but may be considered to be a linear source extending into the page. Test light source 14 may be, for example, an idealized fluorescent lamp, or some other light source that emits light of approximately uniform intensity at each fixture angle 24 from which a ray 12 reaches a point 18.

Each point 18 along ceiling 10 has a normal direction 20 defined perpendicular to the surface at that point 18. Light rays 12 make contact with each point 18 at an angle of incidence 22 defined between the light ray 12 and the surface normal direction 20 at point 18. An incident light intensity I may be calculated for each point 18 using the equation:

$$I = \frac{P}{4\pi r^2}\cos(\theta)$$

where P is the power radiated by test light source 14, r is the distance of point 18 from test light source 14, and $\theta$ is the angle of incidence 22. Because the quantity of interest will be a relative incident light intensity, the power P radiated from test light source 14 may be assigned an arbitrary constant value, such as, for example, 40 units, for purposes of this calculation. An incident light intensity can then be calculated for a plurality of points 18 based on the geometry of the ceiling 10, as shown for some points on exemplary ceiling 10 in columns 1-4 of Table 1 below.

After the incident light intensity at each point 18 has been determined for a test light source 14 of uniform intensity, it also can be determined how much additional ray strength would be needed at each fixture angle 24 to create a desired incident light intensity at each corresponding point 18. In other words, assuming the ability to place a light source in light fixture receptacle 16 that can produce a different ray strength at each fixture angle 24 (in contrast to the uniform ray strength produced by test light source 14), it can be determined what relative ray strength is required at each fixture angle 24 to produce the desired incident light intensity at the corresponding point 18 on ceiling 10. As an example, defining $I_{max}$ as the greatest incident light intensity produced at any point 18 from uniform intensity test light source 14 (which occurs at a fixture angle 24 of ten degrees for exemplary ceiling 10, as shown in Table 1), the relative ray strength needed to produce uniform incident light intensity at each point 18 is simply $I_{max}$ divided by the incident light intensity at that point 18, as shown for exemplary ceiling 10 in column 5 of Table 1 below.

TABLE 1

| Fixture angle (deg) | Distance from fixture to ceiling (inch) | Incident angle (deg) | Incident intensity from uniform source (for P = 40 units) | Relative ray strength needed to produce uniform intensity |
|---|---|---|---|---|
| 0 | 1.73 | 10.62 | 1.04533 | 1.05300 |
| 5 | 1.71 | 6.31 | 1.08197 | 1.01733 |
| 10 | 1.7 | 2.02 | 1.10073 | 1.00000 |
| 15 | 1.7 | 2.23 | 1.10058 | 1.00014 |
| 20 | 1.71 | 6.45 | 1.08168 | 1.01761 |
| 25 | 1.73 | 10.6 | 1.04540 | 1.05293 |
| 30 | 1.76 | 14.69 | 0.99401 | 1.10737 |
| 35 | 1.81 | 18.68 | 0.92042 | 1.19589 |
| 40 | 1.87 | 22.58 | 0.84048 | 1.30964 |
| 45 | 1.95 | 26.34 | 0.75019 | 1.46726 |
| 50 | 2.04 | 29.93 | 0.66286 | 1.66057 |
| 55 | 2.15 | 33.32 | 0.57541 | 1.91295 |
| 60 | 2.29 | 36.45 | 0.48824 | 2.25447 |
| 65 | 2.45 | 39.28 | 0.41048 | 2.68157 |
| 70 | 2.64 | 41.71 | 0.34094 | 3.22847 |
| 75 | 2.86 | 43.71 | 0.28129 | 3.91307 |
| 80 | 3.12 | 45.21 | 0.23037 | 4.77809 |
| 85 | 3.41 | 46.24 | 0.18933 | 5.81382 |
| 90 | 3.74 | 46.82 | 0.15572 | 7.06860 |
| 95 | 4.11 | 46.9 | 0.12875 | 8.54911 |
| 100 | 4.51 | 46.73 | 0.10726 | 10.26166 |
| 105 | 4.95 | 46.44 | 0.08952 | 12.29565 |

TABLE 1-continued

| Fixture angle (deg) | Distance from fixture to ceiling (inch) | Incident angle (deg) | Incident intensity from uniform source (for P = 40 units) | Relative ray strength needed to produce uniform intensity |
|---|---|---|---|---|
| 110 | 5.42 | 46.2 | 0.07499 | 14.67692 |
| 115 | 5.94 | 46.13 | 0.06252 | 17.60583 |
| 120 | 6.5 | 46.31 | 0.05204 | 21.15116 |
| 125 | 7.14 | 47.18 | 0.04243 | 25.93660 |
| 130 | 7.86 | 49.16 | 0.03369 | 32.66882 |
| 135 | 8.75 | 52.38 | 0.02537 | 43.37289 |
| 140 | 9.88 | 56.33 | 0.01807 | 60.88580 |
| 145 | 11.4 | 60.59 | 0.01202 | 91.51895 |
| 150 | 13.51 | 64.94 | 0.00738 | 149.01180 |
| 155 | 16.62 | 69.22 | 0.00408 | 269.23675 |
| 160 | 21.45 | 72.57 | 0.00207 | 531.16738 |
| 165 | 28.08 | 69.4 | 0.00142 | 774.95977 |
| 170 | 33.52 | 56.87 | 0.00154 | 710.91529 |
| 175 | 37.45 | 46.68 | 0.00155 | 706.91292 |
| 180 | 42.99 | 68.47 | 0.00063 | 1741.46527 |

With reference to FIG. 2 and FIG. 3, an embodiment of a light guide assembly 50 that can produce the desired incident light intensity is illustrated. Light guide assembly 50 is a light source that can be placed in light fixture receptacle 16 to produce a different relative ray strength at each fixture angle 24. The exemplary light guide assembly 50 includes a light guide 52 that extends along a longitudinal direction 70 that is essentially parallel with the centerline of the aircraft. Light guide 52 may be made from an optical-grade plastic or other optically conductive material, for example acrylic resin, polycarbonate, epoxy, glass, or the like. In the exemplary embodiment, light guide 52 has a base 54 and an upper portion 56 that is substantially semi-ovoid in cross section. Base 54 may have any shape which facilitates a manufacture of light guide assembly 50 or an installation of light guide assembly 50 into light fixture receptacle 16. In alternative embodiments, light guide 52 may have a cross section that is, for example, semi-circular, more or less than half of a circle truncated by a horizontal chord, rectangular, triangular, or any other suitable shape. Light guide 52 may receive flux input from one or more suitable light sources, such as, but not limited to, a plurality of LEDs 60.

Aspects of the internal structure of exemplary light guide assembly 50 are shown in FIG. 2. The plurality of LEDs 60 each may include a generally flat light-emitting base 64, such as a circuit board or chip, and a curved bulb surface 62. In alternative embodiments, one or more LEDs 60 may not include the curved bulb surface 62, but rather may emit light in undirected fashion from base 64. In the exemplary embodiment, base 54 of light guide assembly 50 includes a plurality of cavities 58 each shaped to receive at least a portion of the bulb surface 62 of a corresponding LED 60. The shape and manner of coupling of bulb surface 62 and cavity 58 may be chosen to optimize the capture of flux 68 from LED 60 inside light guide 52, as is known in the art. In some embodiments, an optical-grade epoxy may be disposed between the bulb surface 62 and a receiving surface of the corresponding cavity 58. For embodiments in which an LED 60 with no curved bulb surface 62 is used, the corresponding cavity 58 may be shaped to fit LED base 64, or LED base 64 may be coupled to a flat outer surface of light guide 52.

A base 64 of each LED 60 is connected to a source of power (not shown) and to appropriate control circuitry (not shown). A distance 66 along longitudinal direction 70 between adjacent LEDs 60 is chosen to provide light guide assembly 50 with generally consistent input flux along its length. In addition, multiple cavities 58 and corresponding LEDs 60 may be placed side-by-side at a given location relative to longitudinal direction 70. In alternative embodiments, at least some cavities 58 may be located in an end of a section of light guide 52, and at least some corresponding LEDs 60 may be received with base 64 oriented in a plane substantially perpendicular to longitudinal direction 70. A total number of LEDs 60 provided in light guide assembly 50 may be determined based on the total amount of flux 68 necessary to achieve the desired incident light intensity on ceiling 10 over the course of longitudinal direction 70.

Aspects of the surface structure of exemplary light guide assembly 50 are shown in FIG. 3. An outer surface 72 of light guide 52 is generally treated to facilitate the entrapment of flux 68 emitted from LEDs 60 within light guide 52. For example, outer surface 72 may be manufactured to have mirror-like smoothness and coated with white reflecting paint. At certain locations, however, light extraction features 74 are disposed on outer surface 72. Each light extraction feature 74 may be formed by removing the reflecting paint from outer surface 72 at the desired location, and optionally further by creating a notch, dimple, bump, or other variation in the smooth outer surface 72. It should be noted that the representation of light extraction features 74 in FIG. 3 is not to scale, as it is known to dispose as many as 180,000 light extraction features within one square inch of surface area of a light guide.

In general, as a size of a particular light extraction feature 74 is increased, a proportion of flux 68 that escapes from that particular light extraction feature 74 increases correspondingly. The size may be increased by increasing one or more dimensions such as, but not limited to, a circumference, perimeter, or depth of the light extraction feature 74. In addition, a contour of the light extraction feature 74, such as an angle made by a bump or dimple relative to outer surface 72, can be chosen to determine a direction of flux 68 that escapes from the light extraction feature 74, as is known in the art. In some embodiments, a shape of light extraction features 74 is chosen such that flux 68 escapes substantially in a direction normal to outer surface 72 at each light extraction feature 74. A portion of light guide 52 extending along longitudinal direction 70 may be defined as a unit length 76 of light guide 52, and a pattern 78 of light extraction features 74 may be repeated on outer surface 72 for each unit length 76.

The exemplary ceiling 10 is shown again in FIG. 4 with exemplary light guide assembly 50 installed in light fixture receptacle 16. In FIG. 4, longitudinal direction 70 shown in FIG. 3 extends into the page. With reference to FIG. 3 and FIG. 4, an intensity distribution at each point 18 of ceiling 10 is determined by a number and size of light extraction features 74 at each fixture angle 24 along a unit length 76 of light guide 52 along the longitudinal direction 70. A desired intensity of incident light at each point 18 can be achieved by determining the number and size of light extraction features 74 at each fixture angle 24 along a unit length 76 based on the relative ray strength data in Table 1. For example, in an embodiment, all extraction features 74 have the same size, and a uniform intensity of incident light at each point 18 is achieved by a pattern 78, for each unit length 76, composed of a number of light extraction features 74 at each fixture angle 24 equal to the corresponding value in column five of Table 1, rounded to the nearest whole number. In other words, the embodiment of light guide assembly 50 has one extraction feature 74 per unit length 76 at fixture angles of 0 to 45 degrees, two extraction features 74 per unit length 76 at fixture angles of 50 to 60 degrees, and so on up to 1,741 extraction features 74 per unit length 76 at a fixture angle of 180 degrees. In alternative embodiments, extraction features 74 of relatively larger size are used at larger fixture angles 24 to reduce the 1,741 to 1 disparity in extraction features per unit length 76, facilitating an ability to dispose a full pattern of extraction features 74 in a relatively shorter unit length 76. It should be understood that, although Table 1 shows calculations only for five-degree increments of fixture angle 24, the same calculations may be done for much smaller increments of fixture angle 24, and corresponding light extraction features can be added at each of those much smaller increments in order to facilitate producing an incident intensity on ceiling 10 that appears smooth to the human eye.

In some embodiments, particularly when a minimum sufficient number of LEDs 60 is used, the amount of flux 68 available to exit the light guide 52 at a particular unit length 76 decreases as a distance from one or more LEDs 60 increases. In order to maintain a desired incident light distribution consistently for each of a plurality of unit lengths 76 along the longitudinal direction 70, for each unit length 76 at least one of a number and a size of light extraction features 74 at each fixture angle 24 may be adjusted in proportion to the distance of that unit length 76 from one or more of the plurality of LEDs 60.

An alternative embodiment of a light guide assembly, designated as light guide assembly 150, is illustrated in FIG. 5. Light guide assembly 150 includes a light guide 152 having a generally curved wall 156, with a wall thickness 180, a base width 182, an outer surface 172, and an inner surface 184. Light guide 152, like the previously described light guide 52, may be made from an optical-grade plastic or other optically conductive material, for example acrylic resin, polycarbonate, epoxy, glass, or the like.

In the exemplary embodiment of FIG. 5, one or more LEDs 60 are installed at an end of light guide 152 to facilitate the capture of flux 68 inside light guide 152 from each LED 60. Alternatively or in addition, one or more LEDs 60 can be installed in the bottom edges of light guide 152, spaced along longitudinal direction 70. In addition, a curvature of wall 156 and wall thickness 180 are chosen such that light rays internal to curved wall 156 generally are internally reflected when they encounter outer surface 172 or inner surface 184. In an embodiment, for example, curved wall 156 is of approximately semi-circular shape, wall thickness 180 is 5 millimeters, and base width 182 is 25 millimeters. Unlike light guide 52, therefore, outer surface 172 of light guide 152 generally need not be treated to facilitate the entrapment inside light guide 152 of flux 68 emitted from LEDs 60, although such treatment may optionally be performed.

At certain locations, light extraction features 174 are disposed on outer surface 172. Each light extraction feature 174 may be formed by creating a notch, dimple, bump, or other variation in smooth outer surface 172. Alternatively, some light extraction features 174 may implemented as a variation, such as a printed dot, on inner surface 184 that causes a light ray incident on the variation to reflect at an angle such that the reflected ray escapes at an opposite point on smooth outer surface 172. At least some internal light rays within curved wall 156 that encounter an extraction feature 174 are emitted as flux 68 from outer surface 172. It should again be noted that the representation of light extraction features 74 in FIG. 5 is not to scale. As previously described with respect to light extraction features 74, as a size of a particular light extraction feature 174 is increased, a proportion of flux 68 that escapes from that particular light extraction feature 174 increases correspondingly. The size may be increased by increasing one or more dimensions such as, but not limited to, a circumference, perimeter, or depth of the light extraction feature 174. In addition, a contour of the light extraction feature 174, such as an angle made by a bump or dimple relative to outer surface 172, can be chosen to determine a direction of flux 68 that escapes from the light extraction feature 174, as is known in the art. In some embodiments, a shape of light extraction features 174 is chosen such that flux 68 escapes substantially in a direction normal to outer surface 172 at each light extraction feature 174.

As with the previously described embodiment of light guide 52, a portion of light guide 152 extending along longitudinal direction 70 may be defined as a unit length 176 of light guide 152, and a pattern 78 of light extraction features 174 may be repeated on outer surface 172 for each unit length 176. The pattern 78 can be designed as previously described, that is, for each unit length 176 of light guide 152, at least one of a number and a size of the light extraction features 174 at each fixture angle 24 can be determined based on the relative ray strength calculated for that fixture angle 24 to produce a desired incident light intensity on a surface such as ceiling 10 when light guide assembly 150 is installed in light fixture receptacle 16.

The relative incident intensity data in Table 1 also can be used to design surface intensity patterns that are other than uniform. As a simple example, with reference again to FIG. 4, if it is desired to make a middle portion 80 of ceiling 10 appear approximately twice as bright as the outer portions, the relative intensity numbers in column 5 of Table 1 for fixture angles 24 between about 135 degrees and 165 degrees can be doubled. In other words, pattern 78 could include double the listed number of light extraction features 74 at those fixture angles 24, or alternatively could include the listed number of light extraction features 74 each sized to allow double the amount of flux 68 to escape relative to the light extraction features at other fixture angles 24. In alternative embodiments, more complex lighting effects are achieved. For example, with reference to FIG. 6, a design 82, such as a decorative design, can be created on ceiling 10 extending along longitudinal direction 70. At each station along longitudinal direction 70, such as station 86 shown in FIG. 6, a swath 84 of design 82 is constructed by providing the corresponding unit length 76 of light guide assembly 50, or alternatively light guide assembly 150, with the pattern 78 of light extraction features needed to generate swath 84.

Referring to FIG. 7, an embodiment of a method 100 of making a light guide for an aircraft passenger cabin is shown. Method 100 includes determining 102, for each of the plurality of points 18 on an interior surface of the cabin, such as ceiling 10, a corresponding fixture angle 24 of a ray 12 drawn to the point 18 from light fixture receptacle 16, a distance of the point 18 from light fixture receptacle 16, and an angle of incidence of ray 12 at the point 18. Method 100 also includes calculating 104 an incident light intensity for each of the plurality of points 18 based on the distance and the angle of incidence, assuming a light source that emits light of uniform intensity at each fixture angle 24, such as test light source 14, is in light fixture receptacle 16. The method further includes calculating 106 a relative ray strength from each fixture angle 24 that is needed to produce a desired incident light intensity at each corresponding point 18, and providing 108 light guide 52 (or, alternatively, light guide 152) comprising a plurality of light extraction features 74 (or 174), wherein for a unit length 76 of light guide, at least one of a number and a size of the light extraction features at each fixture angle 24 are determined based on the relative ray strength calculated for that fixture angle 24.

Embodiments of method 100 may also include coupling 110 a plurality of LEDs 60 to the light guide to form light guide assembly that provides a total flux output necessary to achieve the desired incident light intensity, and installing 112 the light guide assembly in light fixture receptacle 16. Method 100 may further include providing 114 each unit length 76 of the light guide with an identical pattern 78 of light extraction features to produce a uniform incident light intensity at each point on ceiling 10 along longitudinal direction 70. Alternatively, method 100 may include providing 116 each of a plurality of unit lengths 76 of the light guide assembly with a pattern 78 of light extraction features 74 needed to generate a corresponding swath 84 of a desired design 82 on the interior surface, such as ceiling 10.

Each of the processes of method 100 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and an customer may be an airline, leasing company, military entity, service organization, and so on. Moreover, although an aerospace example is shown, the principles of the invention may be applied to other industries, such as the automotive industry.

The implementations described herein provide a light guide for an aircraft passenger cabin that produces a desired incident light intensity at each point of an interior surface. The light guide includes a plurality of light extraction features for each unit length of the light guide, and at least one of a number and a size of the light extraction features at each fixture angle of the light guide are determined based on the relative ray strength needed to produce the desired incident light intensity at the corresponding point on the interior surface. The light guide assembly facilitates an ability to implement a precisely designed distribution of illumination on a surface. For example, the light guide assembly can selectively provide stronger illumination of a portion of a surface relatively distant from the light source without the need to increase the flux output in all other directions as well, as would be required with previous systems. This facilitates increasing an efficiency and reducing an input power needed to provide the desired level of illumination. Additionally, the light guide assembly facilitates capturing and redistributing almost the entirety of the flux generated by the light source, further increasing an efficiency and reducing an input power needed to provide the desired level of illumination.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making a light guide for an aircraft passenger cabin, said method comprising:
   determining, for each of a plurality of points on an interior surface of the cabin, a corresponding fixture angle of a ray drawn to the point from a light fixture receptacle, a distance of the point from the light fixture receptacle, and an angle of incidence of the ray at the point, wherein the light fixture receptacle extends in a longitudinal direction and the fixture angles are measured in a plane normal to the longitudinal direction;
   calculating a theoretical incident light intensity for each of the plurality of points based on the distance, the angle of incidence, and theoretical light of uniform intensity emitted from the light fixture receptacle at each fixture angle;
   calculating a relative ray strength from each fixture angle needed to produce a desired incident light intensity at each corresponding point, wherein the relative ray strength is the desired incident light intensity at the corresponding point divided by the theoretical incident light intensity at the corresponding point;
   spacing a plurality of light sources longitudinally along the light guide, the light guide configured to extend longitudinally in the light fixture receptacle and including a base surface and a curved outer surface, wherein each of the plurality of light sources includes a light emitting surface coupled directly to the base surface, wherein the light guide is configured to propagate light received from the light sources as internal flux within the light guide along the longitudinal direction; and
   disposing a plurality of light extraction features in a first pattern on the outer surface of a first unit length of the light guide, each of the light extraction features configured to emit the internal flux from the light guide substantially in a direction normal to the outer surface at the light extraction feature, the first pattern arranged in rows, each of the rows extends longitudinally along the outer surface, each of the rows is configured to emit light at a corresponding one of the fixture angles at a fixture angle intensity corresponding to the calculated relative ray strength for the respective fixture angle, such that light emitted from the outer surface over a range of the fixture angles in the plane normal to the longitudinal direction is substantially non-uniform, wherein a number of light extraction features in each of the rows is proportional to the relative ray strength calculated for the corresponding fixture angle.

2. The method in accordance with claim 1, further comprising disposing a corresponding plurality of light extraction features in the first pattern on each of a plurality of unit lengths of the light guide.

3. The method in accordance with claim 1, wherein spacing the plurality of light sources longitudinally along the light guide comprises coupling a plurality of LEDs to the light guide to form a light guide assembly, the plurality of LEDs configured to provide a total flux output necessary to achieve the desired incident light intensity at each of the plurality of points.

4. The method in accordance with claim 3, further comprising disposing a second pattern of light extraction features on a second unit length of the light guide, the second pattern arranged in rows, each of the rows in the second pattern extends longitudinally along the outer surface, each of the rows of the second pattern is configured to emit light at a corresponding one of the fixture angles, wherein a number of light extraction features in each of the rows in the second pattern is adjusted from the number of light extraction features in the corresponding row in the first pattern in proportion to a distance along the longitudinal direction of the second unit length from one or more of the plurality of LEDs.

5. The method in accordance with claim 1, wherein the desired incident light intensity at each point comprises a desired decorative design, wherein said disposing the plurality of light extraction features in the first pattern further comprises arranging the first pattern to generate a corresponding swath of the desired decorative design on the surface.

6. The method in accordance with claim 1, wherein said calculating a relative ray strength from each fixture angle needed to produce a desired incident light intensity at each corresponding point comprises calculating a relative ray strength from each fixture angle needed to produce a uniform incident light intensity at each corresponding point.

7. A method of providing uniform illumination for a panel of an aircraft cabin, the panel comprising a plurality of points each associated with a corresponding fixture angle of a ray drawn to the point from a light fixture receptacle, wherein the light fixture receptacle extends in a longitudinal direction and the fixture angles are measured in a plane normal to the longitudinal direction, said method comprising:

positioning a light guide assembly in the light fixture receptacle, the light guide assembly comprising a light guide and a plurality of light sources spaced longitudinally along the light guide, the light guide configured to extend longitudinally in the light fixture receptacle and including a base surface and a curved outer surface, wherein each of the plurality of light sources includes a light emitting surface coupled directly to the base surface, wherein the light guide is configured to propagate light received from the light sources as internal flux within the light guide along the longitudinal direction, and wherein a plurality of light extraction features is disposed in a first pattern on the outer surface of a first unit length of the light guide, each of the light extraction features configured to emit the internal flux from the light guide substantially in a direction normal to the outer surface at the light extraction feature, the first pattern arranged in rows, each of the rows extends longitudinally along the outer surface, each of the rows is configured to emit light at a corresponding one of the fixture angles at a fixture angle intensity corresponding to the calculated relative ray strength for the respective fixture angle, such that light emitted from the outer surface over a range of the fixture angles in the plane normal to the longitudinal direction is substantially non-uniform, wherein a number of light extraction features in each of the rows is inversely proportional to a theoretical incident light intensity given by $$I = \frac{P}{4\pi r^2}\cos(\theta)$$

where, for each fixture angle, r is a distance of the corresponding point from the light fixture receptacle, θ is an angle of incidence of the ray at the point, and P is an arbitrary constant value.

8. The method in accordance with claim 7, wherein said positioning the light guide assembly further comprises positioning the light guide assembly that includes the light guide extending for a plurality of unit lengths, wherein a corresponding plurality of light extraction features in the first pattern is disposed on each unit length.

9. The method in accordance with claim 7, wherein said positioning the light guide assembly further comprises positioning the light guide assembly that includes the light sources implemented as a plurality of LEDs coupled to the light guide, the plurality of LEDs configured to provide a total flux output necessary to achieve the desired incident light intensity at each of the plurality of points.

10. The method in accordance with claim 9, wherein said positioning the light guide assembly further comprises positioning the light guide assembly that includes a second unit length of the light guide having a second pattern of light extraction features disposed thereon, the second pattern arranged in rows, each of the rows in the second pattern extends longitudinally along the outer surface, each of the rows of the second pattern is configured to emit light at a corresponding one of the fixture angles, wherein a number of light extraction features in each of the rows in the second pattern is adjusted from the number of light extraction features in the corresponding row in the first pattern in proportion to a distance along the longitudinal direction of the second unit length from one or more of the plurality of LEDs.

11. A light guide assembly for illuminating a surface of an aircraft passenger cabin, the surface comprising a plurality of points each associated with a corresponding fixture angle of a ray drawn to the point from a light fixture receptacle, wherein the light fixture receptacle extends in a longitudinal direction and the fixture angles are measured in a plane normal to the longitudinal direction, said light guide assembly comprising:

a light guide configured to extend longitudinally in the light fixture receptacle, said light guide comprising a base surface, a curved outer surface, and a first unit length;

a plurality of light sources spaced longitudinally along said light guide, each of said light sources comprising a light emitting surface coupled directly to said base surface, said light guide configured to propagate light received from said light sources as internal flux within said light guide along the longitudinal direction; and a plurality of light extraction features disposed on said outer surface of said first unit length in a first pattern, each of said light extraction features configured to emit the internal flux from said light guide substantially in a direction normal to said outer surface at said light extraction feature, said first pattern arranged in rows, each of said rows extends longitudinally along said outer surface, each of said rows is configured to emit light at a corresponding one of the fixture angles at a fixture angle intensity corresponding to a calculated relative ray strength for the respective fixture angle, such that light emitted from said outer surface over a range of the fixture angles in the plane normal to the longitudinal direction is substantially non-uniform, wherein a number of said light extraction features in each of said rows is proportional to the calculated relative ray strength for the corresponding fixture angle to produce a desired light intensity, wherein:

the relative ray strength of each ray is the desired incident light intensity at the point associated with the corresponding fixture angle divided by a theoretical incident light intensity at the associated point, and the theoretical incident light intensity for each of the plurality of points is based on a distance of the corresponding point from the light fixture receptacle, an angle of incidence of the ray at the point, and theoretical light of uniform intensity emitted from the light fixture receptacle at each fixture angle.

12. The light guide assembly in accordance with claim 11, wherein said light guide further comprises a plurality of unit lengths, a corresponding plurality of light extraction features is disposed in the first pattern on each of said plurality of unit lengths.

13. The light guide assembly in accordance with claim 11, wherein said plurality of light sources comprises a plurality of LEDs configured to provide a total flux output necessary to achieve the desired incident light intensity at each of the plurality of points.

14. The light guide assembly in accordance with claim 13, wherein said light guide further comprises:
a second unit length; and
a second plurality of light extraction features disposed on said second unit length in a second pattern, the second pattern arranged in rows, each of said rows in said second pattern extends longitudinally along said outer surface, each of said rows of said second pattern is configured to emit light at a corresponding one of the fixture angles, wherein a number of light extraction features in each of said rows of said second pattern is adjusted from the first pattern in proportion to a distance along the longitudinal direction of said second unit length from one or more of said plurality of LEDs.

15. The light guide assembly in accordance with claim 11, wherein the desired incident light intensity at each point comprises a desired decorative design and said first pattern is configured to generate a corresponding swath of the desired decorative design on the surface.

16. The light guide assembly in accordance with claim 11, wherein the desired incident light intensity at each point comprises a uniform incident light intensity at each point.

17. The light guide assembly in accordance with claim 11, wherein said light guide outer surface is treated to facilitate entrapment of flux emitted from each said light source within said light guide, and each of said plurality of light extraction features comprises a variation in said outer surface.

18. The light guide assembly in accordance with claim 11, wherein said light guide further comprises a curved wall having said outer surface and an inner surface, said outer surface and said inner surface configured such that a substantial portion of flux emitted from said light source into said base surface is internally reflected by said outer surface and said inner surface, and each of said plurality of light extraction features comprises a variation in said outer surface.

19. The light guide assembly in accordance with claim 11, wherein said light guide is made from an optically conductive material.

20. The light guide assembly in accordance with claim 19, wherein said optically conductive material comprises one of acrylic resin, polycarbonate, epoxy, and glass.

* * * * *